United States Patent [19]
Ladouce

[11] Patent Number: 5,980,810
[45] Date of Patent: Nov. 9, 1999

[54] TIRE MOLD

[75] Inventor: Jean-Pierre Ladouce, Fribourg, Switzerland

[73] Assignee: Sedepro Societe Anonyme, Paris, France

[21] Appl. No.: 09/025,118

[22] Filed: Feb. 17, 1998

[30] Foreign Application Priority Data

Feb. 19, 1997 [FR] France ................................. 97 02051

[51] Int. Cl.[6] ................................................ B29C 35/00
[52] U.S. Cl. ........................... 264/326; 425/46; 425/47; 425/812; 425/39
[58] Field of Search .................................. 264/315, 326; 425/28.1, 46, 47, 32, 812, 39

[56] References Cited

U.S. PATENT DOCUMENTS

| | | |
|---|---|---|
| 4,013,390 | 3/1977 | Moeller et al. . |
| 4,691,431 | 9/1987 | Hayata ................................. 425/28.1 |
| 5,120,209 | 6/1992 | MacMillan . |
| 5,180,592 | 1/1993 | Laurent ..................................... 425/46 |
| 5,340,294 | 8/1994 | Kata ......................................... 425/46 |
| 5,492,669 | 2/1996 | Laurent et al. ......................... 264/326 |
| 5,639,326 | 6/1997 | Soulalioux ................................ 425/46 |
| 5,656,107 | 8/1997 | Laurent et al. . |
| 5,798,076 | 8/1998 | Ladouce ................................. 264/326 |

Primary Examiner—Mathieu D. Vargot
Attorney, Agent, or Firm—Baker & Botts, L.L.P.

[57] ABSTRACT

The tire mold includes a peripheral ring split into two parts (G and D). The peripheral ring is laminated. It consists of a stack in the circumferential direction of a number of thin adjacent elements (1) made, for example, of metal sheets. The elements are of two different types: standard elements and intermediate elements, which follow on from one another circumferentially. The mold includes alignment means interacting with said intermediate elements in order to impose an orientation with respect to the radial direction on said intermediate elements. These means are, for example, grooves in which the intermediate elements are engaged.

13 Claims, 3 Drawing Sheets

TIRE MOLD

BACKGROUND OF THE INVENTION

The present invention relates to the manufacture of tires. More specifically, it relates to the molding of the tread of such tires.

U.S. Pat. No. 5,492,669 describes a type of mold in which a great many metal sheets are arranged transversely to mold the tread. It is said here that the metal sheets, that is to say the molding elements, are oriented transversely because, when looking at the tire, they run from one of its shoulders to the other.

To open and close this type of mold requires coordinated movement, in a radial direction, of all the basic elements of the laminated peripheral ring. It is possible that the successive cycles of opening and of closing the mold will, in time, cause the metal sheets to become inclined with respect to their initial orientation, especially on account of parasitic friction responsible for misalignment or slippage of the metal sheets as they move while the mold is being opened and closed. Furthermore, it may prove difficult to maintain a distribution of inter-sheet clearances which is as even as might be desired. Molding flash may therefore occur in the places where the clearance between sheets has become markedly greater than the nominal clearance. Now, the desired objective is to choose the nominal clearance, as is explained in U.S. Pat. No. 5,492,669, specifically to prevent rubber from being able to run between the sheets throughout the mold-closure travel.

The objective of the invention is to overcome this drawback in order to improve the ability of a mold of this kind to mold tires with a high-quality appearance, especially with a quality of appearance which remains constant after many molding cycles.

SUMMARY OF THE INVENTION

The invention proposes a mold for a tire tread, comprising a laminated peripheral ring for molding the outside of the tread, said laminated peripheral ring consisting of a stack in the circumferential direction of a number of thin adjacent elements mounted on a support, said elements being oriented more or less radially and arranged in such a way that there is elastic repulsion between elements, said elastic repulsion being contained by a hoop, the axial movement of which controls the radial movement of said elements, said tread being molded by the radially inside edge faces of said elements, said radially inside edge faces having the desired profile, wherein said elements comprise standard elements and intermediate elements which follow on from one another circumferentially, and wherein the mold comprises alignment means interacting with said intermediate elements in order to impose an orientation with respect to the radial direction on said intermediate elements. Preferably, the mold comprises a number of groups of one or more adjacent intermediate elements, which split said ring into more or less uniform sectors, the standard elements being arranged between said groups of intermediate elements.

In this specification, when a component or a surface is said to be "on the inside" this means that it lies rather toward the center of the mold, that is to say lies on the same side as the interior molding cavity. When it is said to be "on the outside", this means that it lies rather remote from said molding cavity. For example, when discussing the metal sheets that mold the tread, the inside side or edge face is the surface in contact with the rubber during molding, while the outside or outer edge face is the surface in contact with the hoop.

The invention also covers a method of manufacturing a tire using a mold as has just been described. As an option, this method may include a core insert with a shape for manufacturing the interior cavity of the tire, and on which the constituent parts are assembled, and which then molds the interior cavity of the tire during vulcanization. In any event one advantage of this molding method lies in the fact that it gives excellent venting during molding.

The invention is illustrated by describing it in its application to a specific embodiment of the mold. This is the one described more specifically in relation to FIG. 5 of the aforementioned U.S. Pat. No. 5,492,669. This type of mold makes it possible to combine the advantages of so-called "segmented" molds with the advantages of so-called "two-part" molds. For a general explanation of the operation of such a mold, the reader is invited to consult the above-mentioned patent, and in particular that part of this patent that relates to FIG. 5.

DESCRIPTION OF THE DRAWINGS

The following figures illustrate an embodiment of the invention and allow a firm grasp of all its advantages.

DESCRIPTION OF PREFERRED EMBODIMENTS

Figure 7:
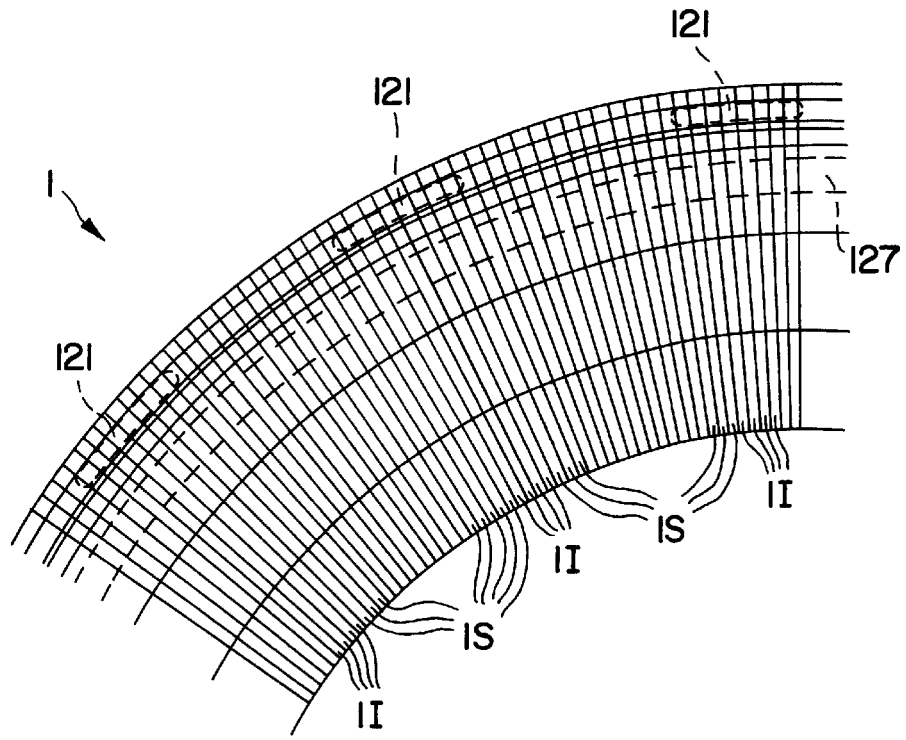
FIG. 7 is a partial side view of a laminated peripheral ring.

In this embodiment of the mold, the laminated peripheral ring used for molding the tread consists of a number of adjacent metal sheets 1 whose thickness is between 0.1 mm (and preferably 0.5 mm) and 5 mm (see FIG. 7). A laminated ring comprises several hundreds of adjacent sheets, or even several thousands. This is a highly advantageous embodiment of the thin elements which are characteristic of this kind of mold. The thickness of the sheets corresponds to the resolution of the mold for defining the tread pattern. Use is made, for example, of steel sheets; they are cut, for example, all perpendicular to their plane, to an outline which is a finction of the tread patterns to be produced.

Figure 1:
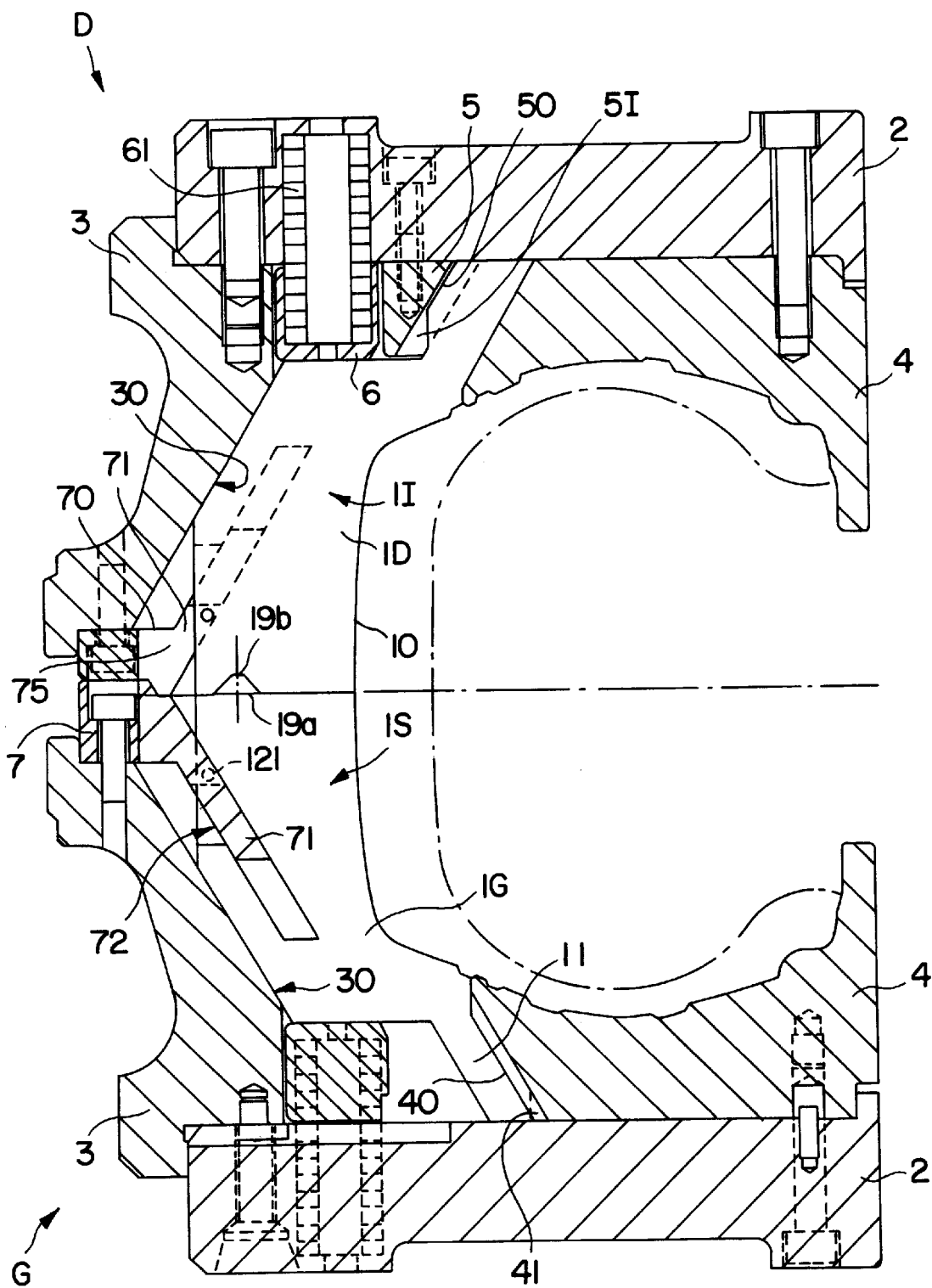
FIG. 1 is a section through the middle of the mold of the invention.

It can be seen from FIG. 1 that the ring is split into two parts (G and D) and that the ring comprises, transversely, two separate and adjacent elements (1D and 1G) each belonging to one of the parts. The molding sheets or elements are denoted, in general, by the reference 1. When an element or part of an element belonging to the part G needs to be identified more specifically, the reference 1G is used. When an element or part of an element belonging to the part D needs to be identified more specifically, the reference 1D is used. Likewise, as will become clear below, the suffixes I and S are used respectively to denote the intermediate and the standard elements or parts of the element.

Figure 3:
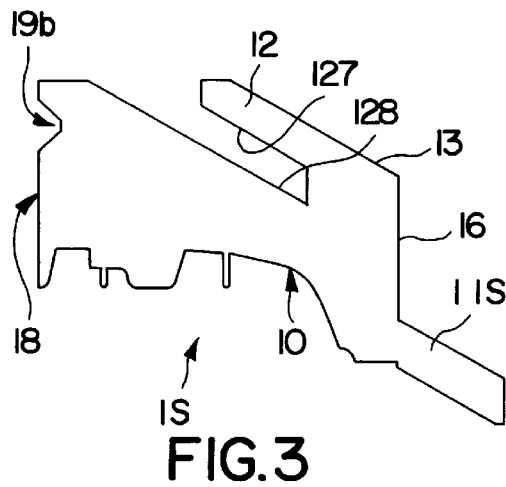
FIG. 3 shows a so-called standard element.
Figure 4:
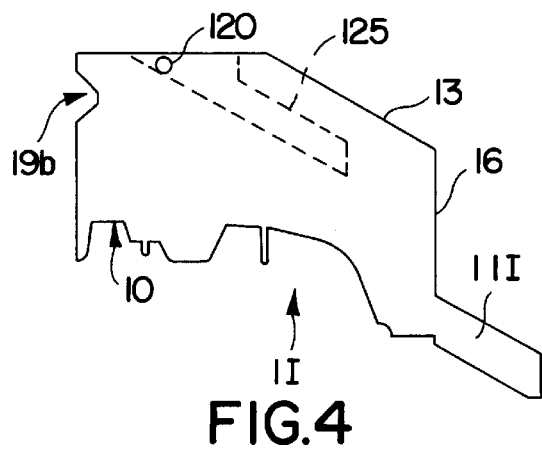
FIG. 4 shows an intermediate element.

FIG. 3 shows a standard element 1S and FIG. 4 shows an intermediate element 1I. Among the characteristics which are common to the standard elements 1S and to the intermediate elements 1I, it can be seen that each of the elements has a molding part 10 on the radially comer edge, this part being cut or shaped to suit the tread pattern to be molded. The inside edge face of the elements therefore has a profile which is dictated by the tread pattern to be molded.

As a preference, at least the end on the molding part side 10 of the elements 1 has a thickness that decreases gradually as it progresses radially toward the axis of the mold. Each of the elements therefore forms a slightly wedge shape, the angle of which more or less corresponds to the value obtained by dividing 360° by the number of elements in one turn of the peripheral molding ring. Each of the standard elements 1S and each of the intermediate elements 1I has a lateral extension 11, a lateral end face 16, an inclined outside edge face 13, and a central end face 18 which is intended to come into contact with the other part against the corresponding central end face 18 of the adjacent element belonging to said other part. Note too, the presence of a lug 19a on each of the sheets 1 in part G, which fits into a cutout 19b made in each sheet 1 of part D, so that the sheets 1 can be positioned with great accuracy at the same radial height throughout the mold-closure phase.

The standard elements 1S all have a cutout in their opposite part to the molding edge face 10. This cutout forms a tab 12 and an edge face 127 on the radially comer side of this tab 12. Although the intermediate elements 1I do not have such a cutout, its outline has been shown on the intermediate elements 1I by the broken line 125, so as to reveal the position of a hole 120 which is tangential to said line at the point that can be seen clearly in FIG. 4.

To form the laminated peripheral ring, the elements 1 are all arranged all at the same angle with respect to the radial direction. In this example, the elements are arranged radially. In other words, when the laminated peripheral ring is examined in section on a plane perpendicular to the axis of the mold (see FIG. 7), the elements are arranged so that they contain a radius, that is to say at an angle of 90° if we use the conventional terminology used to characterize the path of the cords in the tire. It is possible though for the elements to be arranged at an angle which differs slightly from 90°, differing, for example, by about 10° to 15°.

In each of the parts G and D, the mold has a plate 2 on which a hoop 3 is mounted. The hoop has a frustoconical bearing surface 30 of angle α, radially on the inside, in contact with said elements 1 on their radially outside edge faces 13. This hoop allows the sheets 1 to be compressed radially in order to bring them into their closed position and keep them there, as depicted in FIG. 1.

The plate 2 also bears one or more members 5 for guiding the elements, these members comprising a frustoconical bearing surface 50 directed radially inward, inclined at the same angle α as the frustoconical bearing surface 30. The plate also supports shells 4 used for molding the side walls. A frustoconical bearing surface 40 directed radially outward and inclined at the same angle α as the frustoconical bearing surface 30 is formed on the radially outside end face of the shell 4. The lateral extensions 11 of all the elements are inserted between shell 4 and guide members 5, between said frustoconical bearing surfaces.

To make the movement of opening the mold generally easier, a trigger 6 develops an axial force against the lateral end faces 16 of all the elements 1, exerted by one or more springs 61 oriented axially and which, arranged axially between said trigger 6 and the plate 2 exert elastic repulsion between plate 2 a trigger 6. This favors good synchronism of the movement of all the elements, irrespective of their position, especially irrespective of the resistance to separation from the tread pattern which they may encounter at the end of vulcanization.

Figure 2:
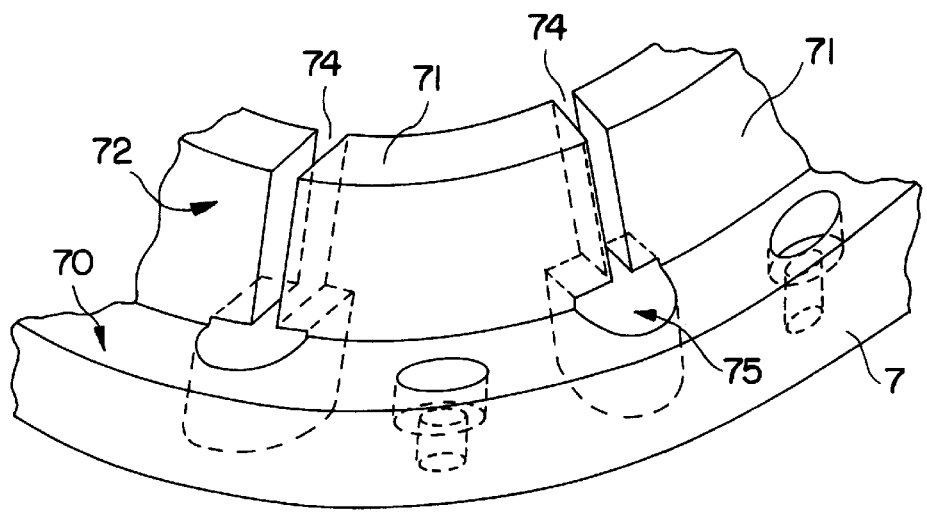
FIG. 2 is a perspective view of an annulus for orienting the intermediate elements.

An annulus 7 is fixed to the end of the hoop 3 furthest from the plate 2. A stop 70 limiting the movement of the elements 1 as the mold is opened is incorporated into the annulus 7. The annulus comprises a certain number of projections 71 arranged on the radially inside part of said annulus, there being slots 74 between said projections (FIG. 2). The intermediate elements 1I slide in these slots 74 (FIG. 1, part D). The annulus 7 also has a recess 75 facing each slot 74. The projections 71 have, on the radially outside side a ramp 72 the purpose of which is to assist with the opening of the mold by pulling out and guiding the metal sheets 1, by pressing against their edge face 127.

According to one feature proposed by the present invention, a number of groups of one or more adjacent intermediate elements 1I split each ring into more or less uniform sectors (FIG. 7). The standard elements 1S are arranged between said groups of intermediate elements 1I. In the embodiment illustrated here, each of the parts G and D of the ring comprises standard elements 1S and intermediate elements 1I, the planes on which part G and part D are sectioned in FIG. 1 being chosen to show a standard element 1S as the first element that can be seen in part G, and an intermediate element 1I as the first element that can be seen in part D. It can be seen in FIG. 2 that the intermediate elements 1I in this embodiment are arranged in bunches of several, for example in bunches of 4 to 10 adjacent elements, this characteristic of course not being restrictive.

The intermediate elements 1I are thus held in place by the slots 74, which are oriented radially in order to hold the intermediate elements 1I. The slots 74 maintain the orientation of the intermediate elements 1I and guide them during mold-opening and mold-closing movements. The spread on the positioning is thus minimized because the differences, if there are any, can build up only over a short part of the circumference. The clearances between elements are distributed more uniformly.

Figure 8:
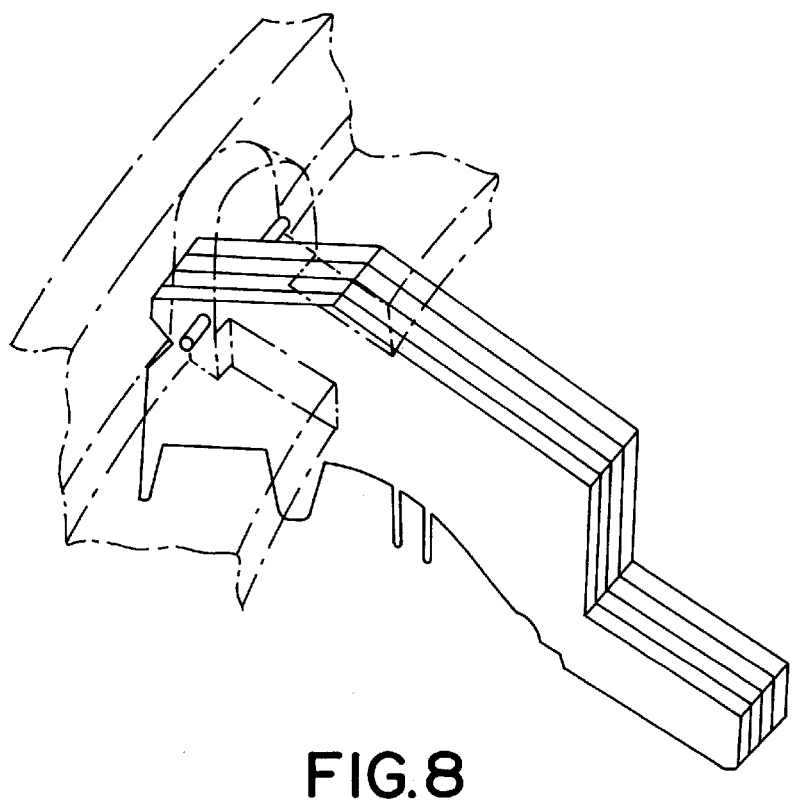
FIG. 8 is a perspective view illustrating a stack of intermediate elements.

To assemble the mold in the workshop, or more specifically to mount each of the parts G and D of the mold, the starting point is a support consisting of the annulus 7. All the standard elements 1S and intermediate elements 1I are prepared to be mounted on the annulus 7 in the order required by the tread pattern to be molded. The standard elements are slipped onto the projections 71 so that they straddle them, with the tab 12 on one side and the rest of the element on the other. A pin 121 is slipped into the holes 120 of a group of intermediate elements 1I (see FIGS. 1, 7 and 8). It is so that said pin 121 can be slipped in and accommodated so that the recesses 75 are made in the annulus 7. The group of intermediate elements is mounted by slipping the protruding parts of the pin 121 over the adjacent standard elements, while at the same time inserting said group into a slot 74.

Note that the dimensions of the recess 75 are calculated to allow this installation. In particular, the width of the recesses in the peripheral direction slightly exceeds the length of the pins 121. Each pin rests on the radially outside edge face 128 of one or more adjacent standard elements 1S, and this prevents the intermediate elements from tipping radially inward because, thanks to the projections 71, the standard elements 1S do not have any degree of freedom in this direction. This accounts for the location of the hole 120 with respect to the cutout as shown in broken line 125 in FIG. 4.

In order better to hold the intermediate elements, the mold optionally comprises grooves 5I, made in said guide members 5, and in which said intermediate elements 1I are inserted to impose the circumferential position on said intermediate elements 1I. The guide members consist of small segments which are arcs of circles, slightly longer than each bundle of intermediate elements, and just thick enough to accommodate each groove 5I. The extensions 11 are mounted with radial clearance between said extensions and the guide members. The standard elements 1S are stacked between the bundles of intermediate elements 1I. The standard elements 1S are thus guided by the intermediate elements 1I. The circumferential position and the orientation of said elements, seen in the plane perpendicular to the axis of the mold, are thus defined more positively due to the fact that the intermediate elements are held by action bearing surfaces which are far apart (the slots 74 and the grooves 5I).

Figure 5:
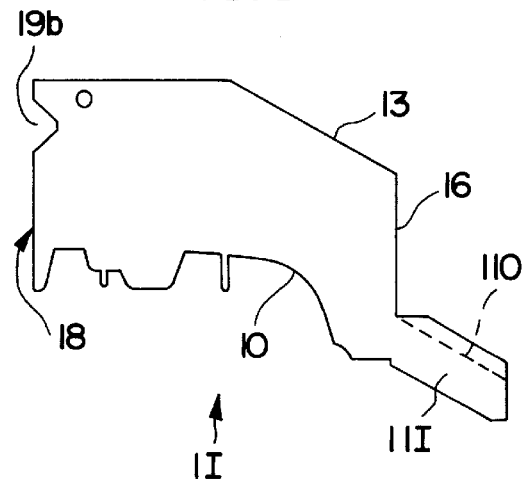
FIGS. 5 and 6 show alternative forms of an intermediate element.

In FIG. 5, as far as the elements 1I are concerned, it can be seen that each of the lateral extensions 11I is taller than is the case with the standard elements 1S, the height of the extensions of which is shown by the broken line 110. The lateral extension 11I therefore forms, with respect to the lateral extensions of the adjacent standard elements, a protrusion which can be inserted in a groove 5I (FIG. 1).

Figure 6:
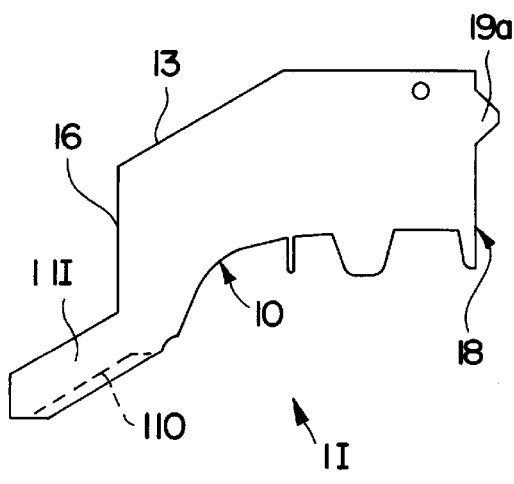

A second groove 4I might be cut facing each groove 5I in the frustoconical bearing surface 40 of the shell 4 (see part G of FIG. 1). In FIG. 6, it can be seen that each of the lateral extensions 11I extends radially inward more than is the case with the standard elements 1S, the extent of which is shown by the broken line 110. The lateral extension 11I therefore forms, with respect to the lateral extensions of the adjacent standard elements, a protrusion that can be inserted in said groove. It is possible to use grooves 4I on the shell 4 instead of or in addition to the grooves 5I provided on the guide element.

Depicted in FIG. 6 is an element that belongs to part G of the mold. It therefore comprises a lug 19a. In FIG. 5, it is an element belonging to part D of the mold which is depicted, facing the element depicted in FIG. 6. It therefore comprises corresponding cutout 19b. Of course, this feature is independent of whether the element in question is a standard element or an intermediate element, the drawing of FIGS. 5 and 6 also having the purpose of making it easier to understand the interaction between the elements at the central end faces 18.

Of course, numerous alternative forms can be envisaged. The intermediate elements can be engaged in a single slot or groove. The groove or grooves may have an entirely different appearance. The distribution of standard elements to intermediate elements may differ. The essential feature is that there should be a function of guiding at least some intermediate elements in the radial direction, this guiding function preferably being distributed around the entire periphery of the mold.

I claim:

1. A mold for a tire tread, comprising a laminated peripheral ring for molding the outside of the tread, said laminated peripheral ring being defined by a stack in the circumferential direction of a number of thin adjacent elements mounted on a support, said elements being oriented substantially radially and arranged to provide elastic repulsion between elements, said elastic repulsion being contained by a hoop, the axial movement of which controls the radial movement of said elements, said tread being molded by the radially inner edge faces of said elements, said radially inner edge faces having the desired profile, wherein said elements comprise standard elements and intermediate elements different from the standard elements, the standard elements and the intermediate elements following on from one another circumferentially, and wherein the mold comprises alignment means interacting with said intermediate elements and not with said standard elements in order to maintain said intermediate elements oriented substantially radially as all of the elements are moved radially by the hoop between an outer open condition and an inner molding condition, the intermediate molding elements maintaining the radial orientation of the standard elements interposed between the intermediate elements.

2. The mold as claimed in claim 1, wherein said alignment means comprise slots formed in said support for accommodating only the intermediate elements and in which said intermediate elements are inserted.

3. The mold as claimed in claim 2, wherein the slots are on an annulus mounted on said hoop, between projections arranged on the radially inside part of said annulus, the radially outside part of said intermediate elements being inserted in these slots.

4. The mold as claimed in claim 1, wherein said alignment means comprise grooves made in said support and in which only said intermediate elements are inserted.

5. The mold as claimed in claim 4, wherein each of the elements has a lateral extension arranged radially toward the inside of the elements, said mold comprising a member for guiding the elements, said grooves being cut in said guide member to accommodate said lateral extensions of the intermediate elements.

6. The mold as claimed in claim 1, wherein a number of groups of one or more adjacent intermediate elements split said ring into substantially uniform sectors, the standard elements being arranged between said groups of intermediate elements.

7. The mold as claimed in claim 1, wherein the ring is split into two parts, wherein the ring comprises, transversely, two separate and adjacent elements each belonging to one of the parts, each having an end face intended to come into contact with the other part against the corresponding end face of the adjacent element belonging to said other part.

8. The mold as claimed in one of claim 1, wherein each element has a thickness of between 0.1 mm and 5 mm and wherein the elements have a thickness that decreases gradually as it progresses radially toward the axis of the mold.

9. A method of manufacturing a tire, using a mold comprising a laminated peripheral ring for molding the outside of the tread, said laminated peripheral ring being defined by a stack in the circumferential direction of a number of thin adjacent elements mounted on a support, said elements being oriented substantially radially and arranged to provide elastic repulsion between elements, said elastic repulsion being contained by a hoop, the axial movement of which controls the radial movement of said elements, said tread being molded by the radially inner edge faces of said elements, said radially inner edge faces having the desired profile, wherein said elements comprise standard elements and intermediate elements different from the standard elements which follow on from one another circumferentially, and wherein the mold further comprises alignment means interacting with said intermediate elements and not with said standard elements in order to maintain said intermediate elements oriented substantially radially as all of the elements are moved radially by the hoop between outer open condition and inner molding condition, the intermediate molding elements maintaining the radial alignment of the standard elements interposed between the intermediate elements, said method including venting the mold by means of the spaces between elements.

10. A mold for a tire tread comprising a laminated peripheral ring defined by a circumferential stack of thin adjacent molding elements oriented substantially radially and having elastic repulsion between the elements, the radially inner edge faces of the elements having the desired profile to mold the tread when the elements are moved from an outer position to a radially inner molding position and the stack is compressed in opposition to the elastic repulsion, the stack comprising standard elements and intermediate elements interposed between groups of standard elements, actuating means for moving the elements between an outer open condition of the mold and an inner closed molding condition, means interacting between the actuating means and the standard elements and not the intermediate elements to move the standard elements from molding condition to open condition, and alignment means interacting with the intermediate elements and not the standard elements for maintaining the intermediate elements oriented substantially radially when the elements are moved between open and closed conditions of the mold.

11. A mold as set forth in claim 10, in which the interacting means between the actuating means and the standard elements are circumferentially spaced interlocking means between the actuating means and the standard elements and in which the alignment means include spaces interposed between the interlocking means.

12. A mold as set forth in claim 10, including circumferentially extending means bridging intermediate elements with adjacent standard elements so as to move the intermediate elements from molding to open condition with the standard elements.

13. A mold as set forth in claim 10, in which the intermediate elements have extensions with outer edges and including grooves in the mold for receiving the outer edges of the extensions to maintain the radial orientation of the intermediate elements.

* * * * *

UNITED STATES PATENT AND TRADEMARK OFFICE
CERTIFICATE OF CORRECTION

PATENT NO.   : 5,980,810

DATED        : 11/9/99

INVENTOR(S) : Jean-Pierre Ladouce

It is certified that error appears in the above-identified patent and that said Letters Patent is hereby corrected as shown below:

Col. 6, line 60: "bv" should read --by--;

Col. 2, line 50: "finction" should read --function--;

Col. 3, line 2: "comer" should read --corner--;

Col. 3, line 25: "comer" should read --corner--.

Signed and Sealed this

Twenty-seventh Day of March, 2001

*Attest:*

NICHOLAS P. GODICI

*Attesting Officer*   *Acting Director of the United States Patent and Trademark Office*